United States Patent
Shaikh et al.

(10) Patent No.: US 10,969,846 B2
(45) Date of Patent: Apr. 6, 2021

(54) SECURE COMMUNICATION INITIATION AND EXECUTION FOR DATACENTER POWER CONTROL

(71) Applicant: Virtual Power Systems, Inc., Milpitas, CA (US)

(72) Inventors: Karimulla Raja Shaikh, Cupertino, CA (US); Clark A. Jeria Frias, San Jose, CA (US); Ravi Subramaniam, San Jose, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 159 days.

(21) Appl. No.: 15/989,521

(22) Filed: May 25, 2018

(65) Prior Publication Data

US 2018/0341307 A1 Nov. 29, 2018

Related U.S. Application Data

(60) Provisional application No. 62/511,130, filed on May 25, 2017, provisional application No. 62/527,091, (Continued)

(51) Int. Cl.
*G06F 1/32* (2019.01)
*G06F 1/26* (2006.01)
(Continued)

(52) U.S. Cl.
CPC .............. *G06F 1/263* (2013.01); *G06F 1/266* (2013.01); *G06F 1/3203* (2013.01); *G06F 1/3206* (2013.01)

(58) Field of Classification Search
CPC ... G06F 9/5094; G06F 1/3206; H04L 63/1416
See application file for complete search history.

(56) References Cited

U.S. PATENT DOCUMENTS 6,396,170 B1    5/2002   Laufenberg et al.
6,967,283 B2   11/2005   Rasmussen et al.
(Continued)

FOREIGN PATENT DOCUMENTS

EP    2372861 B1    10/2011
JP    2009232521 A  10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — Albert Wang
(74) *Attorney, Agent, or Firm* — Adams Intellex, PLC

(57) ABSTRACT

In disclosed techniques, secure communication initiation and execution is used for datacenter power control. Information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The datacenter power infrastructure control is modified based on decryption of the first data payload by the second component within the datacenter. The first data payload provides for intelligent power control within the datacenter. Modifying the datacenter power infrastructure control dynamically changes power control within the datacenter. The changing power control changes power policies within the datacenter. The first component is authenticated using the first data payload. Encryption includes obscurity. The decryption ignores the obscurity.

23 Claims, 10 Drawing Sheets

Related U.S. Application Data filed on Jun. 30, 2017, provisional application No. 62/523,732, filed on Jun. 22, 2017, provisional application No. 62/550,009, filed on Aug. 25, 2017, provisional application No. 62/638,453, filed on Mar. 5, 2018, provisional application No. 62/666,773, filed on May 4, 2018.

(51) Int. Cl.
  *G06F 1/3206* (2019.01)
  *G06F 1/3203* (2019.01)

(56) References Cited

U.S. PATENT DOCUMENTS

| | | | |
|---|---|---|---|
| 7,236,896 B2 | 6/2007 | Farkas et al. | |
| 8,067,857 B2 | 11/2011 | Humphrey et al. | |
| 8,193,662 B1 | 6/2012 | Carlson et al. | |
| 8,195,944 B2 | 6/2012 | Sherburne et al. | |
| 8,384,546 B2 | 2/2013 | Foley et al. | |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,880,578 B2 | 11/2014 | Porel et al. | |
| 8,958,923 B2 | 2/2015 | Kake et al. | |
| 9,038,136 B2 | 5/2015 | Deisinger et al. | |
| 9,112,770 B2 | 8/2015 | Sankaran | |
| 9,231,759 B2 | 1/2016 | Chan et al. | |
| 9,270,700 B2 | 2/2016 | Medvinsky et al. | |
| 9,300,546 B2 | 3/2016 | Ogata et al. | |
| 9,338,741 B2 | 5/2016 | Xie et al. | |
| 9,489,543 B2 | 11/2016 | Jinaraj et al. | |
| 9,497,573 B2 | 11/2016 | Guo et al. | |
| 9,503,431 B2 | 11/2016 | Chen et al. | |
| 9,516,040 B2 | 12/2016 | Oz et al. | |
| 9,557,792 B1* | 1/2017 | Potlapally | H05K 7/1492 |
| 9,641,025 B2 | 5/2017 | Agrawal et al. | |
| 9,865,998 B1 | 1/2018 | Emert et al. | |
| 9,871,408 B2 | 1/2018 | Narita | |
| 2003/0056125 A1 | 3/2003 | O'Conner et al. | |
| 2005/0071092 A1 | 3/2005 | Farkas et al. | |
| 2005/0162019 A1 | 7/2005 | Masciarelli et al. | |
| 2006/0082222 A1 | 4/2006 | Pincu et al. | |
| 2007/0216229 A1 | 9/2007 | Johnson, Jr. et al. | |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0037225 A1 | 2/2010 | Doyle et al. | |
| 2010/0058092 A1 | 3/2010 | Bougaev et al. | |
| 2010/0077238 A1 | 3/2010 | Vogman et al. | |
| 2010/0102633 A1 | 4/2010 | Seaton | |
| 2010/0205469 A1 | 8/2010 | McCarthy et al. | |
| 2010/0211810 A1 | 8/2010 | Nacho | |
| 2010/0264741 A1 | 10/2010 | Togare | |
| 2010/0328849 A1 | 12/2010 | Ewing et al. | |
| 2011/0133559 A1 | 6/2011 | Yamashita et al. | |
| 2011/0245988 A1 | 10/2011 | Ingels et al. | |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2013/0202111 A1 | 8/2013 | El Gamal et al. | |
| 2015/0057821 A1 | 2/2015 | Nasle | |
| 2015/0378408 A1 | 12/2015 | Kaplan | |
| 2015/0380968 A1 | 12/2015 | Lee | |
| 2016/0020609 A1 | 1/2016 | Carrasco et al. | |
| 2016/0066184 A1 | 3/2016 | Bhargav-Spantzel et al. | |
| 2016/0197884 A1 | 7/2016 | May | |
| 2016/0202744 A1* | 7/2016 | Castro-Leon | H04L 67/1097 713/310 |
| 2016/0209901 A1 | 7/2016 | Wilcox et al. | |
| 2016/0246737 A1 | 8/2016 | Vichodes et al. | |
| 2016/0320825 A1 | 11/2016 | Panda et al. | |
| 2017/0005515 A1 | 1/2017 | Sanders | |
| 2017/0025876 A1 | 1/2017 | Chan | |
| 2017/0177047 A1 | 6/2017 | Fluman et al. | |
| 2017/0201425 A1 | 7/2017 | Marinelli et al. | |
| 2017/0322241 A1 | 11/2017 | Tang et al. | |
| 2019/0122132 A1 | 4/2019 | Rimini et al. | |

FOREIGN PATENT DOCUMENTS

| | | |
|---|---|---|
| KR | WO2012091323 A2 | 7/2012 |
| WO | WO2011119444 A2 | 9/2011 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

* cited by examiner

SECURE COMMUNICATION INITIATION AND EXECUTION FOR DATACENTER POWER CONTROL

RELATED APPLICATIONS

This application claims the benefit of U.S. provisional patent applications "Secure Communication Initiation and Execution for Datacenter Power Control" Ser. No. 62/511,130, filed May 25, 2017, "Augmented Power Control Within a Datacenter Using Predictive Modeling" Ser. No. 62/527,091, filed Jun. 30, 2017, "Datacenter Power Management Using AC and DC Power Sources" Ser. No. 62/523,732, filed Jun. 22, 2017, "Scalable Datacenter Power Infrastructure Management" Ser. No. 62/550,009, filed Aug. 25, 2017, "Dynamic Tiering of Datacenter Power for Workloads" Ser. No. 62/638,453, filed Mar. 5, 2018, and "Time Varying Power Management Within Datacenters" Ser. No. 62/666,773, filed May 4, 2018.

Each of the foregoing applications is hereby incorporated by reference in its entirety.

FIELD OF ART

This application relates generally to datacenter communication and more particularly to secure communication initiation and execution for datacenter power control.

BACKGROUND

A datacenter is a facility that is constructed to centralize an organization's information technology (IT) operations and equipment. The organization uses the datacenter to store, manage, and disseminate its valuable and mission-critical data. The datacenter houses and provides at least one network or cluster of heterogeneous and critical systems. The continuous operation of the networks and the systems is vital to the effective operation of the organization. Consequentially, protecting the physical security, software security, power security, and reliability of datacenters and their information are utmost priorities for the organizations.

Datacenters typically consume vary large amounts of power. Due to these demanding power requirements, a considerable portion of the operating budget of an organization is allocated to electricity costs. Datacenters can house many rows of servers, storage devices, routers, and other IT equipment placed together in racks. The racks are commonly referred to as data racks or IT racks. The electricity consumption of the datacenters is often very high in order to power the components and to effectively cool the facility. Additionally, the power demand for both industrial applications and datacenters can fluctuate based on various business factors, such as the time of day, day of month, or season of year. Thus, managing power becomes an important aspect in many industrial applications, including datacenter administration. Furthermore, any energy savings achieved can directly translate into increased profit margins for an organization. Energy savings can also provide additional dividends in terms of reduced wear and tear on power sources and reduced cooling costs, adding to the received benefits of an organization.

Within datacenters, also known as "server farms," there can be hundreds or even thousands of data racks or IT racks. The devices on the racks provide functionality, including the storage, processing, and retrieval of data. Given the power requirements demanded by the rack-mounted devices, reliable and efficient power delivery is crucial for the successful operation of the organizations using the datacenters. In some cases, the reliability and availability obligations placed on the devices that power the datacenter infrastructure must meet or exceed predetermined statutory requirements, as is the case of financial institutions.

Regardless of the type of institution, various infrastructure requirements must be met in order to address the important parameters of availability, reliability, job load, and other organizational requirements of datacenters. For example, the issue of effectively cooling a datacenter (i.e. the removal of copious excess heat) is a critical issue which must be addressed to ensure stable and reliable operation of the datacenter. Each of the many devices in the datacenter generates substantial amounts of heat, whether the device is a server, a blade server, a switch, a backup unit, a communications unit, or another device. The cooling of modern datacenters can directly impact the layout and design of the center. Another significant datacenter design consideration involves providing sufficient, reliable power to the datacenter. Particularly in the case of high-reliability datacenters, such as those used for e-commerce, banking, airline reservations, video distribution, and the like, power can be provided by more than one power grid, or by a combination of a power grid and locally generated power source, to guarantee reliable delivery. Thus, providing reliable and efficient power to the large number of computers and associated equipment in modern datacenters or server farms is an important aspect contributing to the performance of these operations.

SUMMARY

A datacenter of an organization is a facility in which information technology (IT) operations and equipment are centralized. The organization uses the datacenter to perform computational operations and to store, process, manage, and disseminate data valuable to various units and departments in the organization. The datacenter houses a network of the organization's vital, varied, critical systems. The power requirements of a datacenter can vary over time based on application activity, planned maintenance, unplanned equipment failure, and other factors. The other factors can include time of day, day of week, day of month, and further time frames. The other factors can further include seasonal factors such as hot weather, cold weather, hours of daylight, rainy season, etc. Ensuring uninterrupted operation of the datacenter, and protecting the security and reliability of the information resources, is a top priority for organizations. Further, datacenters have large and varied power requirements. Some of the systems in the datacenter have more stringent power and availability requirements than do other systems. Thus, deployment of equipment within a datacenter can be critical.

The datacenters provide vital functions for businesses, governments, educational institutions, medical facilities, and other enterprises. Effectively characterizing the behavior of datacenter power consumption is essential to successfully maintaining consistently high levels of reliability and availability of components of the datacenters. Furthermore, any energy savings achieved can directly translate into increased profit margins for an organization. Energy savings can also provide additional dividends in terms of reduced wear and tear on power sources and reduced cooling costs, adding to the received benefits of an organization.

Disclosed techniques address secure communication initiation and execution for datacenter power control. A processor-implemented method for communication comprises:

encrypting information relating to power control for inclusion in a first data payload, wherein the first data payload is used for datacenter power infrastructure control; sending the first data payload from a first component within a datacenter to a second component within the datacenter, wherein the first component and the second component enable power infrastructure power control of the datacenter; and modifying the datacenter power infrastructure control based on decryption of the first data payload by the second component within the datacenter.

In embodiments, the first data payload provides for intelligent power control within the datacenter. The power control can include adjusting switches, choosing power sources, shaving power to storage, using stored power, etc. The modifying the datacenter power infrastructure control dynamically changes power control within the datacenter. The dynamic changes of power control can include reacting to power load changes of threat scenarios, predicting power load needs, and so on. The modifying the datacenter power infrastructure control changes power policies within the datacenter. The power policies can be based on service level agreements, dynamic service level agreements, etc. Further embodiments include authenticating the first component using the first data payload. The authenticating ensures the veracity of the sender, the integrity of the data payload, and so on.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
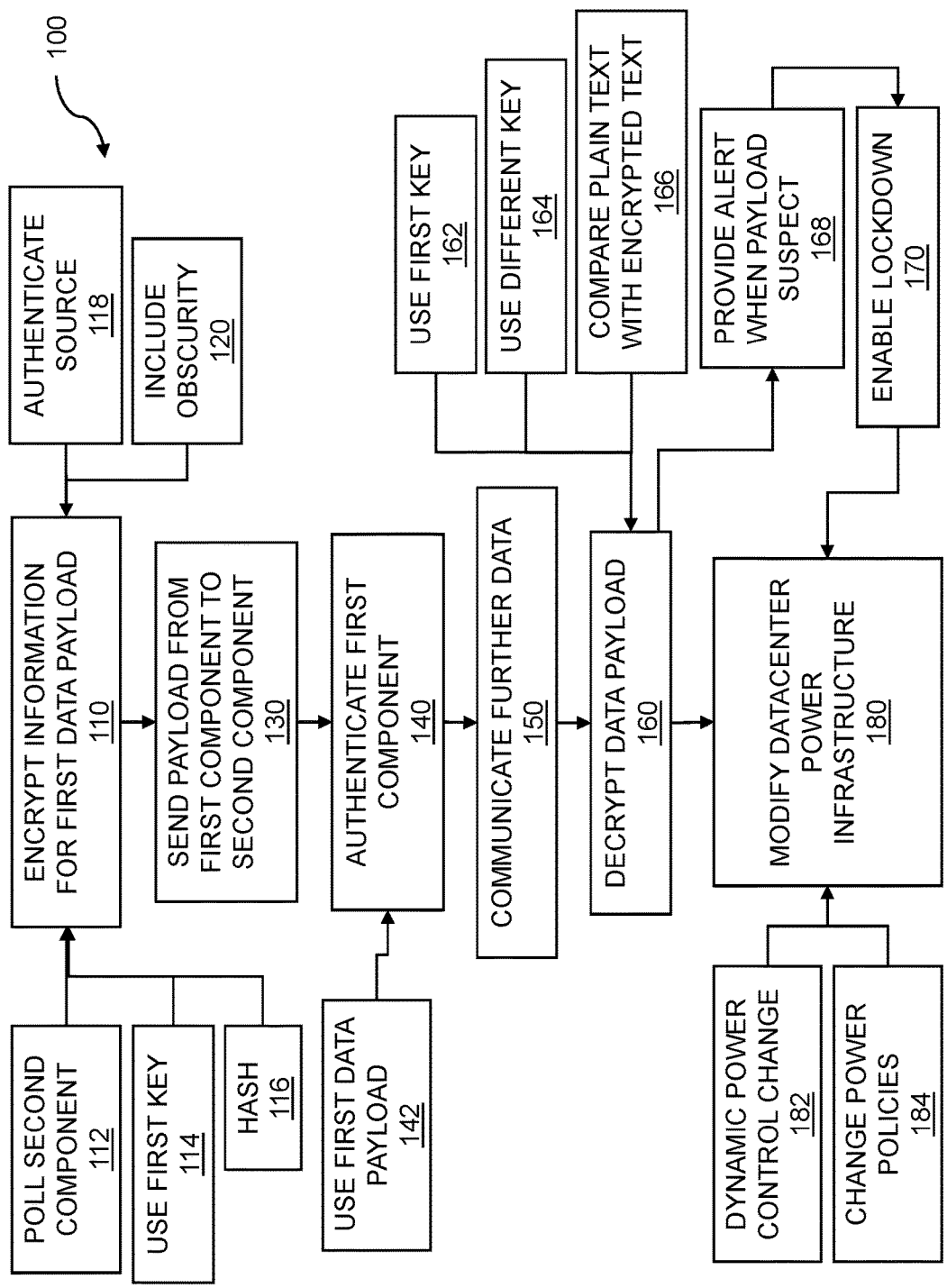
FIG. 1 is a flow diagram for using secure communication for datacenter power control.

This disclosure provides techniques for secure communication initiation and execution for datacenter power control. Managing power infrastructure control efficiently and reliably can be an onerous information technology (IT) task since equipment reliability and availability are paramount concerns. The management of power infrastructure resources is particularly difficult in datacenters because of the number of power loads and the complexities of controlling them. Datacenters can be dedicated to a single organization, can be contracted for use by multiple organizations, and so on. Datacenters can contain hundreds or even thousands of computers and other associated equipment, such as disk arrays, data backups, routers, and other networking and storage equipment. How the organizations use the datacenter can be managed based on the amount of equipment a given organization wishes to locate in the datacenter, power requirements, redundancy requirements for power such as 1N redundancy and 2N redundancy, service level agreements (SLA) for the power, etc. Power systems that are designed for large installations of electrical equipment, such as those designed for datacenters, are configured to meet the dynamic power loads of the installed equipment. The wide range of electrical equipment that can be present in a datacenter can include devices such as servers, blade servers, communications switches, backup data storage units, communications hardware, and other devices. The electrical equipment can include one or more of processors, data servers, server racks, heating, ventilating, and air conditioning (HVAC) units, which are installed to deal with the copious heat that is dissipated by all the electrical equipment in the datacenter.

The power systems receive power from multiple power feeds, where the coupled power feeds can derive from grid power such as hydro, nuclear, coal, or other power plants; local power generation from micro-hydro, wind, solar, geothermal, etc.; diesel generator (DG) sets; and so on. The multiple power feeds—typically numbering at least two—provide critical redundancy in delivery of power to the power system. That is, if one power feed were to go down or be taken offline for maintenance, then another power feed can provide the dynamic power needed to drive the power load of large equipment installations, such as datacenters. The power feeds are coupled to master switch blocks (MSB), switch blocks (SB), and central uninterruptable power supplies (UPS), which are coupled to one or more power distribution units (PDU). The PDUs are coupled to one or more electrical loads and distribute dynamic power to the various loads. The loads can include widely varying dynamic loads, such as those presented by the electrical equipment found of the datacenters. The power that is provided can be based on a specific voltage, current, wattage, multiple voltages, currents, and wattages, etc. The UPS units can provide multiple functions such as overvoltage limiting, undervoltage limiting, battery backup, charge control, inversion (e.g. convert D.C. battery power to A.C. power), etc. Similar to the multiple power feeds, each central UPS can provide sufficient power to drive the dynamic power loads coupled to a given feed until the batteries in the UPS reach a certain level of remaining charge.

Secure communications for initiation and execution for datacenter power control are critical to effective datacenter operation in order to operate the datacenters efficiently and safely. The secure communications can be used to enable dynamic changes in power control and power policies, while protecting the datacenter infrastructure against inadvertent damage or malicious attack. In disclosed techniques, information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The power control can be based on one or more service level agreements (SLA), dynamic SLAs, and the like. The datacenter power infrastructure control is modified based on decryption of the first data payload by the second component within the datacenter. The first data payload provides for intelligent power control within the datacenter.

FIG. 1 is a flow diagram for using secure communication for datacenter power control. The control of power in the datacenter is based on secure communication initiation and execution. The flow 100 shows a processor-implemented method for communication. The flow 100 includes encrypting information relating to power control for inclusion in a first data payload 110. The first data payload is used for datacenter power infrastructure control. The first data payload can include plain text, a timestamp, encrypted text, an encrypted timestamp, controls such as dynamic key reset, and so on. In embodiments, the first data payload can provide for intelligent power control within the datacenter. Intelligent power control can include turning on and off electrical equipment such as servers, blade servers, data servers, communications equipment, etc.; shifting virtual machines to slower processors to reduce power consumption; slowing processor clock rates of servers or blade servers to reduce power consumption; and the like. In embodiments, the first data payload can include a polling of the second component 112. The polling of the second component can determine the status of the second component; the "health" of the second component; in-service status, power load of the second component; and the like.

The encrypting can be based on a variety of techniques. The encryption can be based on using a symmetrical method, an asymmetrical method, and so on. The symmetrical method or the asymmetrical method can be based on a key. Embodiments include encrypting the first data payload using a first key 114. The key can include a symmetrical key or a private key, where the key is kept secure so that only those with access to the key can access the encrypted data of the payload. The key can include an asymmetrical key, such as key from a private key-public key pair. A public key can be shared through a key repository or clearing house and, as the name suggests, can be available to the public. Data such as a payload encrypted with the public key can only be decrypted using the corresponding private key, known only to the intended party, component, etc., to whom or to which the encrypted payload may be sent. The key, whether a symmetrical key or an asymmetrical key, can be shared or communicated. In embodiments, the first key is communicated outside of the power infrastructure power control of the datacenter. As discussed throughout, the communication of the key, whether symmetrical (private) or asymmetrical (public), can be accomplished using a key library, a key clearing house, etc. The first key can be obtained from a key repository. In embodiments, the first key is preloaded into the first component. The preloading is accomplished by installing the key in a component, uploading the key by a user, downloading the key over a computer network, and the like. In some embodiments, the first key implicitly identifies the second component. In these cases, the second component will be identified as a result of queries by the first component or other component within the datacenter. The identification can include a serial number and/or a mac address for the second component.

Another encryption technique can include hashing. In embodiments, encrypting of the first payload is accomplished by hashing 116. Hashing can create a fixed-length signature that is unique to a given message or dataset such as a data payload. Hashing can create a checksum or other verification code. By confirming the checksum or other code against the data or payload, one can verify that the message or data payload that was hashed has not be tampered with, manipulated, or the like. The flow 100 further includes authenticating a source 118 of validation for the encrypting. While one may receive a public key from a key repository, there is no guarantee that the key is indeed the correct key such as a public key or that the key has not been spoofed. The key must be verified by authenticating the source from which the key was obtained. The authentication can be conducted by a third party. In embodiments, the authenticating a source can be identity-less. Identity-less authentication can be based on a one-time code, an authorization app, and so on. In further embodiments, the encrypting includes obscurity 120. The purpose of encrypting, including obscurity, can be to make components within a datacenter difficult to find or identify, to make messages such as payloads that are exchanged between or among components difficult to understand or decrypt, and so on. In embodiments, the obscurity can include misleading information. The misleading information can include random or pseudo-random data in one or more fields that are communicated. The misleading information shows irrelevant information while masking information relating to power control. In other embodiments, the obscurity can include random information. The random information can include random comments and power infrastructure control commands, random characters or "gibberish", masked recipients of data payloads, and so on.

The flow 100 includes sending the first data payload from a first component within a datacenter to a second component 130 within the datacenter. The first component and the second component enable power infrastructure power control of the datacenter. The sending the first data payload can be accomplished by sending the data payload over a computer network such as the Internet, an intranet, or other network; over a network internal to the datacenter; over a secured network; and so on. The computer network can be a wired network, a wireless network, a hybrid network, etc. In embodiments, the first data payload can provide for intelligent power control within the datacenter. The intelligent power control can include providing power to servers, communication equipment, disk farms, storage and backup equipment, and so on. The intelligent power control can control power from grid power, locally generated power, backup power, etc., to the equipment in the datacenter. The flow 100 includes authenticating the first component 140. The authenticating can be based on verifying an identity or credentials of the first component, authenticating through a third party such as a clearing house or a key repository, and so on. The authenticating can include using the first data payload 142. Recall that a hash can be used to verify that data such as a payload has not been tampered with during sending.

The first component and the second component can include equipment that can be commonly found in a datacenter. Such equipment found in the datacenter can include servers, blade servers, communications equipment, storage and backup units, heating, cooling, and air conditioning (HVAC), power equipment, and so on. In embodiments, the first component can include a power controller within the datacenter. The power controller can include a power distribution unit (PDU), a power controller for an equipment rack, a power controller for a group of racks, a power controller for the datacenter, and so on. In embodiments, the first component can include a power switch within the datacenter. The power switch can be used to select from among power sources such as grid power; locally generated power from wind, hydro, diesel-generator sets, etc.; battery backup; and so on. In embodiments, the first component can include a power supply within the datacenter. The power supply can be co-located in a rack with equipment to which the power supply is providing power, located remotely from the equipment, etc. In embodiments, the first component can include a power load within the datacenter. The power load can include a server, communication equipment, a disk farm, a backup system, and so on. In embodiments, the first component comprises a power cache within the datacenter. The power cache can provide power to power loads when the power demand from the power loads exceeds the amount of power that can be supplied by the power supplies. The power cache can receive and store power from the power sources when the amount of power available exceeds the amount of power required by the power loads. In embodiments, the first component can include a power sensor within the datacenter. The power sensor can be used to determine present power demand from a load, available power from a power source, etc.

The second component, and other components, can include datacenter power equipment similar to that of the first component. In embodiments, the second component can include a power controller within the datacenter. The power controller can include a controller different from the first component. In embodiments, the second component can include a power switch within the datacenter. The power switch can be used to select from among available power sources. In embodiments, the second component can include a power supply within the datacenter. The power supply can include an AC power supply, a DC power supply, an AC-to-DC converter, a DC-to-AC converter, and so on. In embodiments, the second component can include a power load within the datacenter. The power load can include one or more items of equipment in the datacenter. In embodiments, the second component comprises a power cache within the datacenter. The power cache can store excess power and can also distribute power when additional power is required to meet power load demands. In embodiments, the second component can include a power sensor within the datacenter. The power sensor can be used to measure power requirements, etc.

The flow 100 includes communicating further data 150 between the first component and the second component based on the authenticating. The communicating further data can including sending additional payloads from the first component to the second component, sending one or payloads from the second component to the first component, and so on. The communicating of data or further data can be based on a communications protocol such as simple network management protocol (SNMP). SNMP enables collecting and organizing information about devices coupled to an internet protocol (IP) network, where the devices, including intelligent devices, can be managed. The managing of the managed IP devices supports changing device behavior through techniques such as modifying device information. In embodiments, a first object identifier (OID) is associated with the first component. The OID can be a numerical value, a text string, an encrypted string, a unique ID, and so on. A second object identifier (OID) can be associated with the second component. Similarly, the second OID can be a numerical value, a text string, etc. The communicating data or further data can include initializing communication using SNMP version 1 or version 2. The initializing communication can occur on an Internet network or other computer network, such as a local area network, on a network internal to a datacenter, etc.

The flow 100 includes decrypting the first data payload 160. The decrypting can be based on a key, where the key can be a symmetric key, a private key, and so on. In embodiments, the decrypting includes using the first key 162 to decrypt the first data payload. The first key can be uploaded by a user, downloaded from the Internet, preloaded, obtained from a key repository, key library, or key clearinghouse, etc. In embodiments, the first key can be preloaded into the second component. In other embodiments, the decrypting includes using a different key 164 to decrypt the first data payload. The different key can include a secret key or private key to decrypt a data payload that was encrypted using the corresponding public key. In situations where a second key has been used to encrypt a data payload, decryption can be accomplished using the second key to decrypt the second data payload. In other embodiments, when using a second key, the decryption can be accomplished using a different key from the second key to decrypt the first data payload. The second key can be obtained using a variety of techniques. In embodiments, the second key is preloaded into the first component. The second key can be preloaded into the first component via uploading by a user such as a systems administrator, downloaded from the Internet, downloaded from a key repository, etc. In other embodiments, the second key is preloaded into the second component.

In embodiments, the decryption can include comparing the plain text with a timestamp against the encrypted text 166 with an encrypted timestamp. The comparing of the plain text data and timestamp with the encrypted data and timestamp can be used to show that the plain text data has not been changed, altered, adjusted, or otherwise manipulated since the encrypted text was generated. In embodiments, the second component can provide an alert when the first data payload is suspect 168. The first data payload may be deemed suspect based on an authentication failure, a mismatch between hash checksums or verification codes, a mismatch between plain text data and encrypted data, and so on. The alert can further be issued based on the first data payload being suspect and one or more additional data payloads being suspect. The additional suspect payloads can be from the first component or from other components. When an alert is provided, various actions can be taken to protect the datacenter. Further embodiments include enabling a datacenter lockdown 170 policy based on the alert. The datacenter lockdown policy can include a default policy, a fallback policy, a failsafe policy, a defensive policy, and so on. The datacenter lockdown policy can protect the electrical equipment in the datacenter from being commandeered, shutdown, ransomed, or damaged, and so on.

The flow 100 includes modifying the datacenter power infrastructure control 180 based on decryption of the first data payload by the second component within the datacenter. The control can include powering up or powering down electrical equipment such as servers, blade servers, data servers, backup and storage equipment, HVAC equipment, and the like. The modifying can include changing power sources from grid power to backup power, performing power shaving to charge backup batteries or capacitors, etc. The modifying can include slowing processors, moving processing jobs to slower processors, and the like. In embodiments, the modifying the datacenter power infrastructure control dynamically changes power control 182 within the datacenter. The dynamic change of power control can be based on service level agreement (SLA), where the SLA may include a dynamic SLA. The dynamic change of power control can be based on reacting to an alert that is provided. Changing power control can be performed to adapt assignments of power sources and power caches to power loads. The change in power control can be necessitated by datacenter equipment coming online or going offline, changes in computing job mixes, changes in equipment, and so on. As mentioned elsewhere, the dynamic changes in power control can address changes in computing job mixes, engaging of datacenter equipment, disengaging of datacenter equipment, etc. In embodiments, the modifying the datacenter power infrastructure control changes power policies 184 within the datacenter. The power policies can address maximum, minimum, and ideal power loads for power sources, usage hours for power sources, percent charge or discharge of power cache batteries, etc. Power policies can be used to control allocations of computing jobs to compute servers based on job priorities. Embodiments can include sending a second data payload from the second component to the first component. The second data payload can include various pieces of information regarding the second component, such as component type, component characteristics, power requirements, etc. Embodiments can include encrypting the second data payload using a second key. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
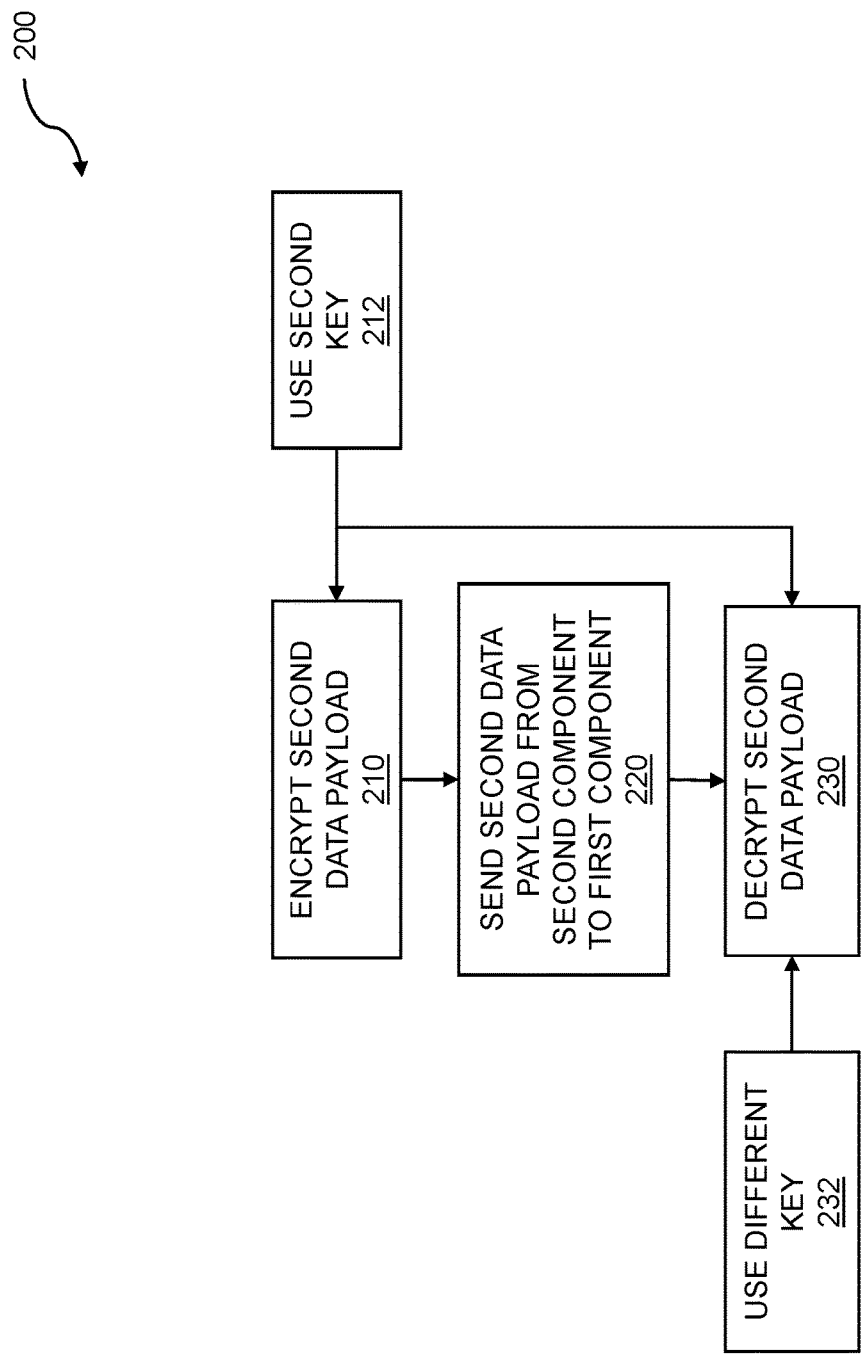
FIG. 2 is a flow diagram for further payload communication in a datacenter.

FIG. 2 is a flow diagram for further payload communication in a datacenter. One or more payloads can be securely communicated between or among components within a datacenter. In addition to the first data payload discussed throughout, a second data payload can be exchanged as part of secure communication initiation and execution for datacenter power control. The flow 200 includes encrypting the second data payload 210. As with the encrypting of the first data payload, the encrypting the second data payload can be accomplished by hashing. The hashing can include cryptographic hashing techniques. The encrypting the second data payload can use a second key 212. The second key can be a symmetric key, where a first component in a datacenter and a second component in a datacenter use the same private key, a private key/public key technique in which the public key is published and shared with the second component while the private key is kept secret by the first component, etc. The second key can be preloaded into the first component, can be preloaded into the second component, and so on. The flow 200 includes sending a second data payload from the second component to the first component 220. The sending can be accomplished using a computer network or other communications network. The flow 200 includes using the second key to decrypt the second data payload 230. The second key can be a symmetric key, a private key known by the first component, etc. In embodiments, the flow 200 includes using a different key 232 from the second key to decrypt the first data payload. The different key can be preloaded into the first component, can be preloaded into the second component, etc. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
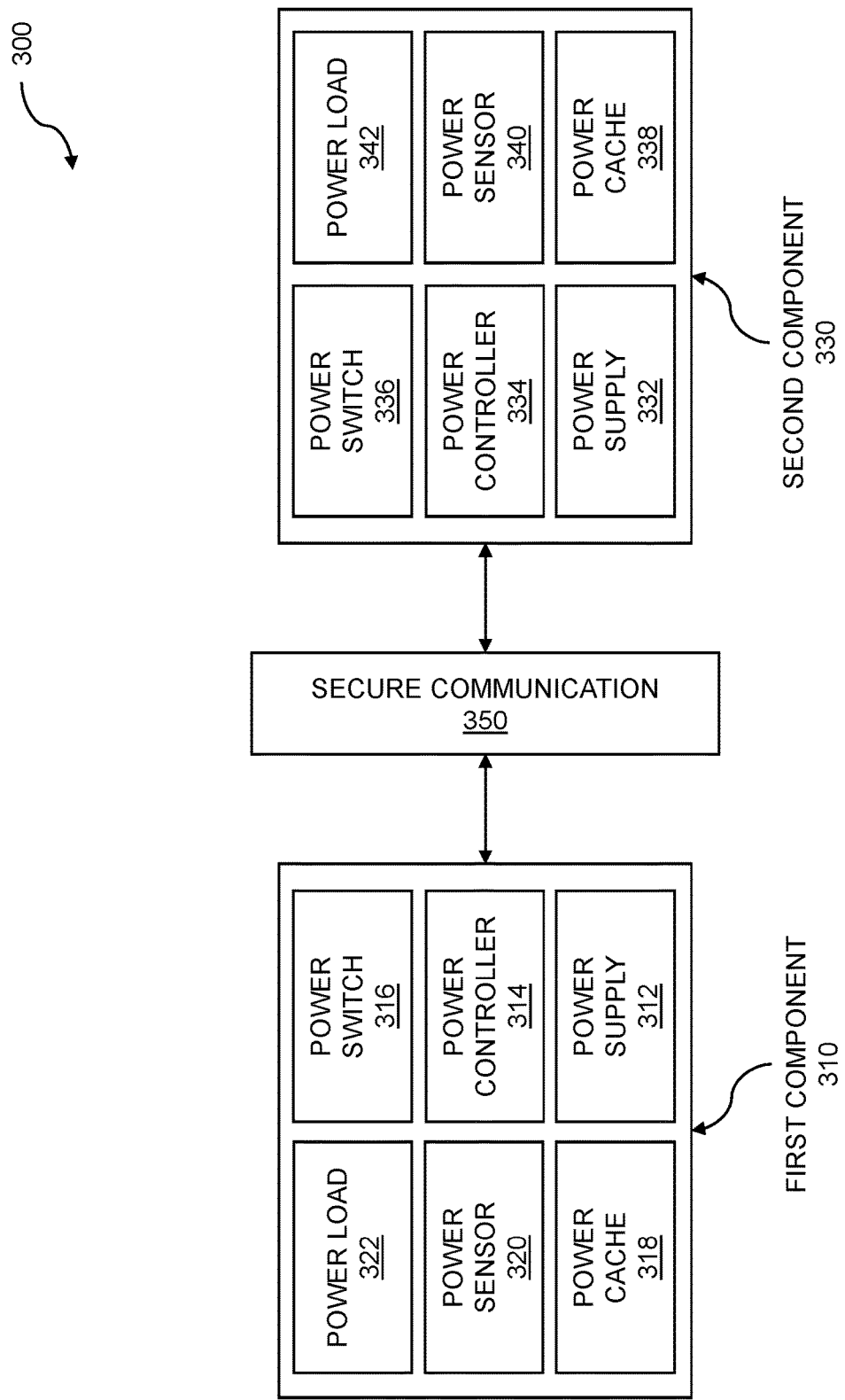
FIG. 3 shows a logic diagram for secure datacenter power control.

FIG. 3 shows a logic diagram for secure datacenter power control. Secure datacenter power control is based on secure communication initiation and execution. Information relating to power control is encrypted for inclusion in a first data payload. The first data payload is used for datacenter power infrastructure control. The first data payload is sent from a first component to a second component within the datacenter. The components enable power infrastructure power control of the datacenter. The datacenter power infrastructure control is modified based on decryption of the first data payload by the second component. The modifying the datacenter power infrastructure control dynamically changes power control within the datacenter. A logic diagram is shown 300 for secure datacenter power control. A first component 310 can communicate with a second component 330 using secure communication 350. The first component can include any of a variety of electrical equipment that may be found in a datacenter. The electrical equipment can include devices such as processors or servers, blade servers, data servers, backup data storage units, communications hardware such as network switches and Internet telephony, and other devices. The electrical equipment can be mounted in one or more racks such as data racks, information technology (IT) racks, and so on. The electrical equipment can include uninterruptable power supplies and other power backup equipment. The electrical equipment can further include heating, ventilating, and air conditioning (HVAC) units, which are installed to deal with the copious heat that is dissipated by all the electrical equipment in the datacenter.

The first component 310 can include one or more of a power controller 314 such as a smart power controller, a power switch 316 for selecting between and among power and backup power sources, a power supply 312, a power load 322, a power cache 318 which can include batteries or capacitors, a power sensor 320 for detecting power load conditions, equipment health, or other factors or parameters, within the datacenter. The second component 330 can include one or more of a power controller 334, a power switch 336 for selecting power sources, a power supply 332, a power load 342, a power cache 338 of batteries or capacitors, a power sensor 340 for detection of power load conditions, equipment health, and the like. The secure communication 350 can handle communications protocols and requirements between the first component and the second component, or between and among other components within the datacenter. The secure communications can include encryption and decryption of one or more payloads. The secure communications may also provide communications that include obscurity, that initiate and terminate private sessions between or among components within the data center, and so on. The secure communications may include establishing and maintaining firewalls or other security measures to prevent or reduce the success of hacking. The secure communications may also provide one or more alerts. An alert may be provided by the second component when the first data payload is suspect, additional data payloads are suspect, and so on. Secure communications may indicate that a datacenter lockdown policy should be initiated based on one or more alerts.

Figure 4:
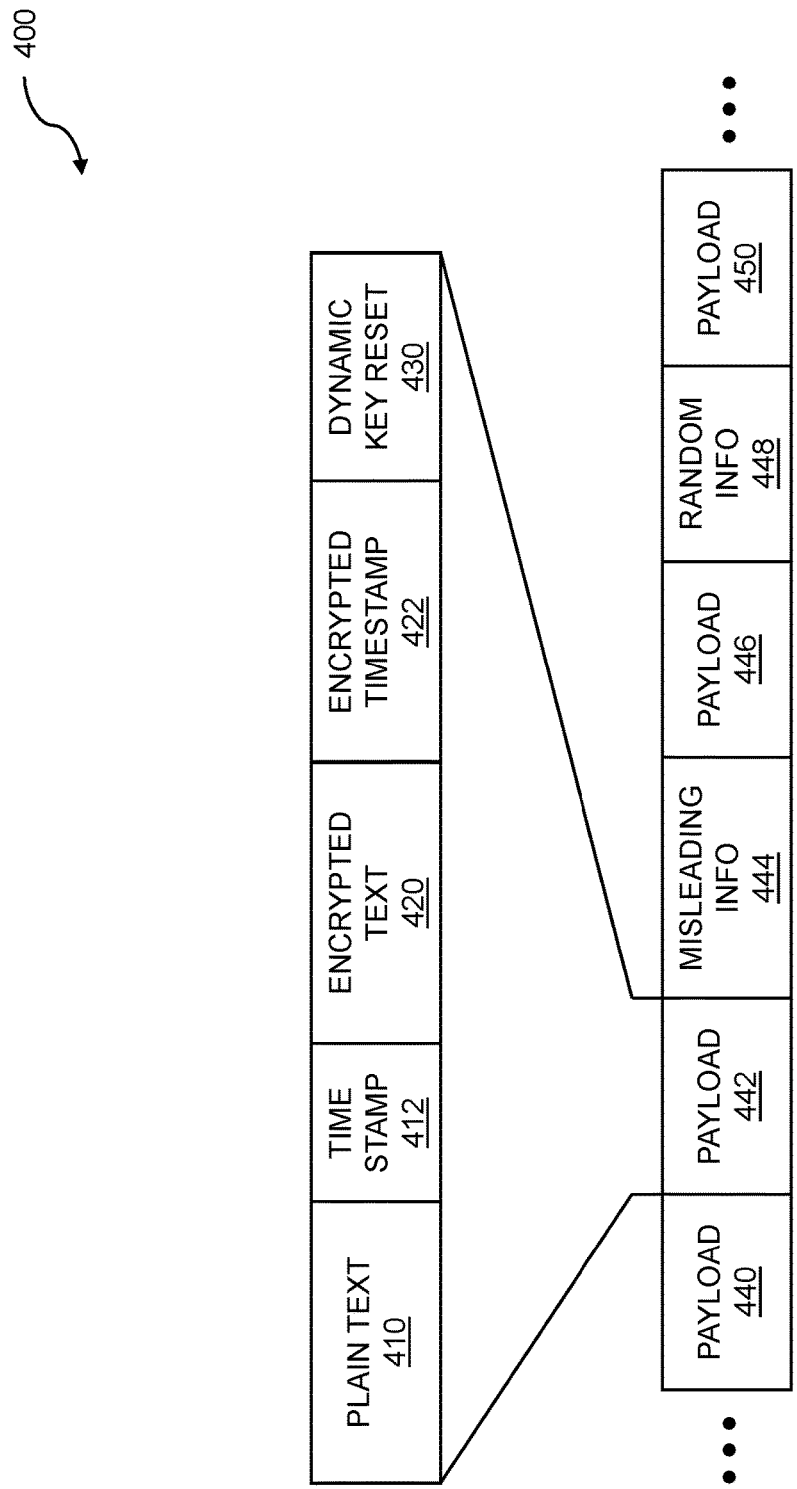
FIG. 4 illustrates example payloads with obscurity.

FIG. 4 illustrates example payloads with obscurity. Payloads including secure payloads can be exchanged between and among components within a data center. The payloads can be exchanged for secure communication initiation and execution for datacenter power control. Information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The datacenter power infrastructure control is modified based on decryption of the first data payload by the second component within the datacenter. Example payloads, including payloads that support obscurity, are shown 400. A payload can provide for intelligent power control within the datacenter. A payload can include information that can be used for power control of datacenter power infrastructure.

The power control information can include plain text 410 and a timestamp 412 relating to the plain text. The plain text within the first payload can include a polling of the second component. Embodiments can include encrypting the first data payload using a first key. The encrypting the first data payload can generate encrypted text 420 and an encrypted timestamp 422. In embodiments, the plain text 410 and timestamp 412 can be combined in a single field as can be the encrypted text 420 and encrypted timestamp 422. The first key can be preloaded into the first component, uploaded by a user, downloaded from a key repository or library over a computer network, and so on. The first key can be communicated outside of the power infrastructure power control of the datacenter.

The first key can include a "valid" a or other factor during which the first key can remain useful. In embodiments, the first key can include dynamic key reset 430. By including dynamic key reset, the duration for the validity of a key can be controlled. If a key were to be found or hacked, the likelihood that the found or hacked key would still be valid would be near or equal to zero. In embodiments, the dynamic key reset can include use of a token. The token can be computed for datacenter infrastructure control, uploaded by a user, download from a computer network, etc. In embodiments, the token can be a session token. Other techniques can be used to control the usefulness of a payload such as "time to live". In embodiments, the first data payload can include an automatic validity expiration. The validity of a payload can expire after a period of time such as millisecond, seconds, minutes, and so on. In embodiments, the automatic validity expiration can be less than or equal to 10 seconds. Other techniques can be used for validating a payload. Embodiments further include authenticating a source of validation for the encrypting. The authenticating can be performed by a key clearing house or other authority. In embodiments, the authenticating a source can be identity-less. Identity-less authentication can be based on a one-time code, an authorization app, and so on. Other techniques can include establishing a private session between two entities. The private session can include an encrypted session, a session based on sharing public encryption keys from private key-public key pairs, etc. In embodiments, one of the two entities can be the first component within the datacenter.

A set of payloads is shown. While the payloads are shown as a set, the payloads can include individual payloads. Individual payloads or sets of payloads can be sent periodically or aperiodically, sent as the payloads are encrypted, and so on. The set of payloads can include valid payloads, such as payload 440, payload 442, payload 446, and payload 450, and invalid payloads such as misleading information 444, random information 448, and the like. The invalid payloads can be used to support obscurity. Obscurity can be used to protect components within a datacenter. Obscurity can be useful for protecting a physical entity such as a datacenter because once the existence of the datacenter is known, the datacenter becomes a target for hackers and other bad actors. The purposes of the hacking can include commandeering the datacenter, disrupting the datacenter, destroying equipment within the datacenter, etc. In embodiments, the obscurity can include misleading information. The misleading information can include out-of-date information, a feint, etc. In other embodiments, the obscurity includes random information. The random information can include information that is unintelligible or "gibberish" such as random characters, information that might be used to control components unrelated to the second component, and the like.

Figure 5:
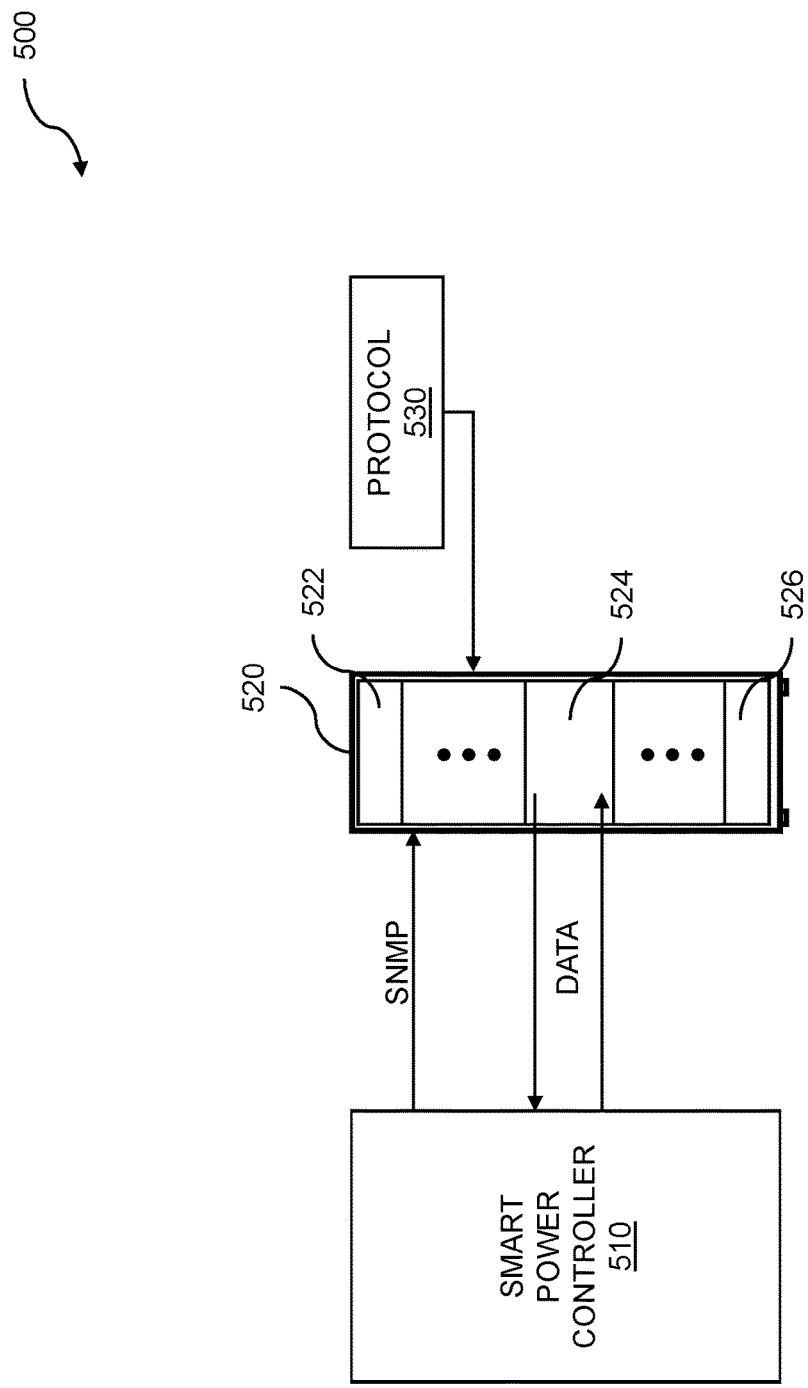
FIG. 5 shows secure communications for power control.

FIG. 5 shows secure communications for power control 500. The power control, including datacenter power control, can be realized using secure communication initiation and execution. Information relating to power control is encrypted for inclusion in a first data payload. The first data payload is sent from a first component to a second component. The components enable power infrastructure power control of a datacenter. The datacenter power infrastructure control is modified based on decryption of the data payload by the second component. A smart power controller 510 is in communication with various pieces of electrical equipment within the datacenter. The datacenter equipment can be mounted in a data rack or information technology (IT) rack 520 or other organizing structure. The rack 520 can include a power cache 522, a server 524, a blade server, communications equipment, backup and storage equipment, a power supply 526, and so on. Simple network management protocol (SNMP) can be used to collect and manage information relating to equipment in the datacenter. In embodiments, the first data payload is communicated using SNMP. One or more data payloads may be sent from the smart power controller 510 to the rack 520. Data, such as polling data, may be sent from the equipment mounted in the rack 520 to the smart power controller 510. Communications between the smart power controller 510 and the various elements mounted in the rack can be controlled by one or more protocols 530. In embodiments, communication is initialized using SNMP version 1 or version 2, performing authenticated key exchange using SNMP version 1 or version 2c. In further embodiments, communication includes communicating the first data payload with SNMP version 3.

Figure 6:
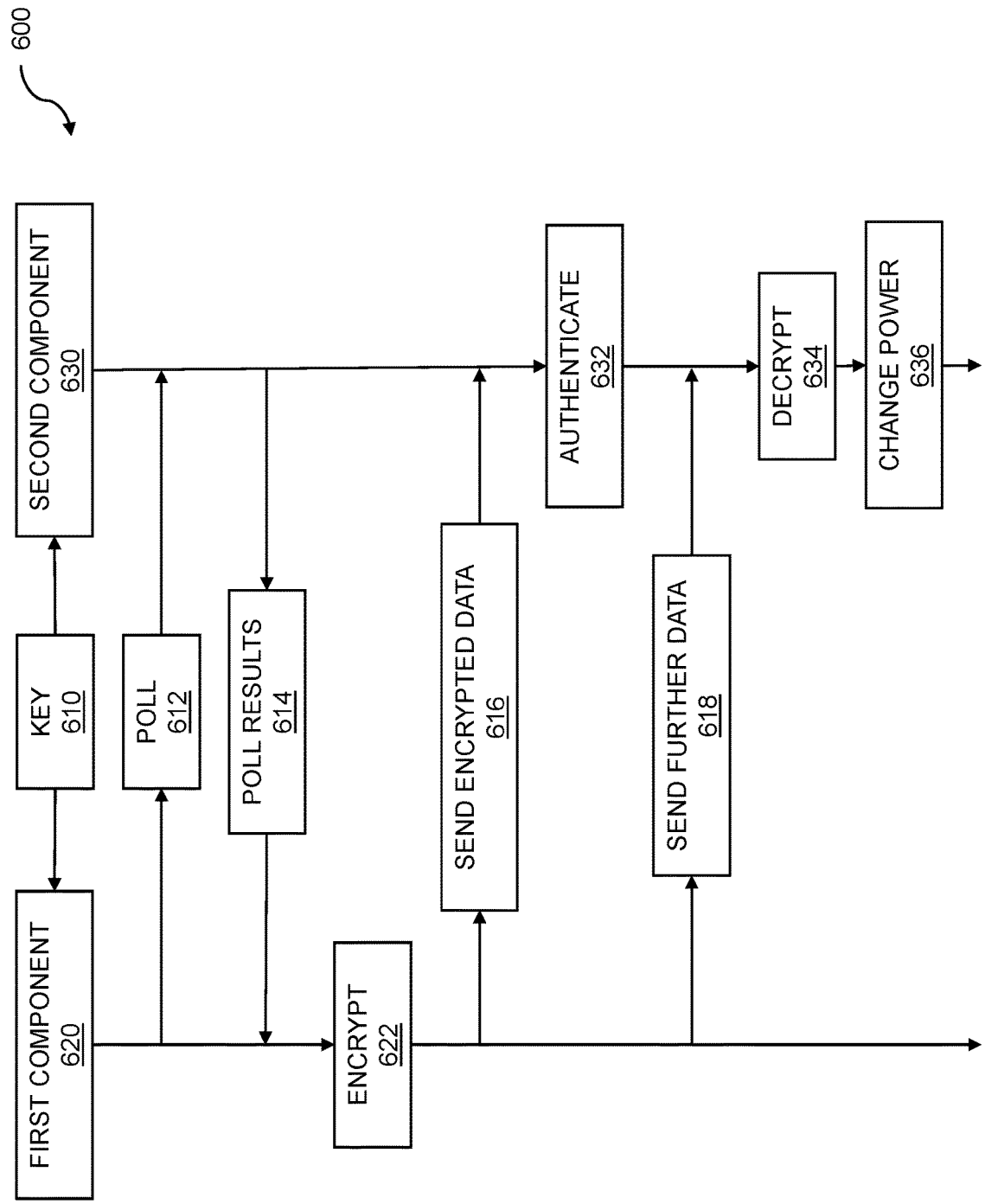
FIG. 6 illustrates message exchange.

FIG. 6 illustrates message exchange. Secure communication initiation and execution can be based on exchanging encrypted messages that are decrypted and used for datacenter power control. Datacenter power control is based on secure communication initiation and execution. Information relating to power control is encrypted for inclusion in a first data payload. The first data payload is used for datacenter power infrastructure control. The first data payload is sent from a first component to a second component, where the components enable power infrastructure power control. The datacenter power infrastructure control is modified based on decryption of the first data payload by the second component. The encrypting can include plain text with a timestamp, and encrypted text with an encrypted timestamp. To confound decryption by unauthorized third parties or unauthorized components, the encrypting can include obscurity. Obscurity can be used to hide components, to muddle message payloads, to provide random control commands, and so on. In embodiments, the obscurity includes misleading information. The misleading information can include unnecessary component references, ambiguous or irrelevant commands, and the like. In other embodiments, the obscurity can include random information. The random information can include irrelevant information, random character groups or streams, etc. In order for the encryption-decryption technique to operate correctly, the decryption can ignore the obscurity. That is, the misleading information or the random information that may be included in a payload can be ignored. In embodiments, the decryption includes comparing the plain text with a timestamp against the encrypted text with an encrypted timestamp. The encryption-decryption technique can be used actively to ensure secure communication within the datacenter. In embodiments, the second component can provide an alert when the first data payload is suspect. The alert can be asserted for a single suspect payload or for multiple data payloads. In embodiments, the alert is based on the first data payload being suspect and one or more additional data payloads being suspect. In the event that an alert is provided, control of the data can respond appropriately. Further embodiments include enabling a datacenter lockdown policy based on the alert. The lockdown policy can include a policy such as a default, backup, lockdown, reactive, proactive, defensive, or similar policy.

Message exchange 600 occurs between a first component 620 and a second component 630. In order for the message exchange to be secure, a key 610 is provided to the first component 620 and the second component 630. The key can be communicated outside of a simple network management protocol (SNMP). In embodiments, the key, including a first key, can be communicated outside of the simple network management protocol (SNMP), preloaded into the first component, preloaded into the second component, communicated over a different bus system than that used by the SNMP, or obtained from a key repository. Message exchange 600 includes polling 612 of the second component 630 by the first component 620. The polling can include requesting credentials from the second component 630, requesting a key, and so on. The second component 630 returns poll results 614 to the first component 620. The first component 620 encrypts 622 a first data payload. The encrypting can be accomplished by hashing. The encrypted first data payload is sent 616 to the second component 630. The second component 630 authenticates 632 the first component using the first data payload. The message exchange 600 can include sending further data 618. The communicating further data between the first component 620 and the second component 630 can be based on the authenticating. The first data payload, and the second data payload, if present, is decrypted 634. Based on the decrypting the one or more data payloads, power control is changed 636.

Figure 7:
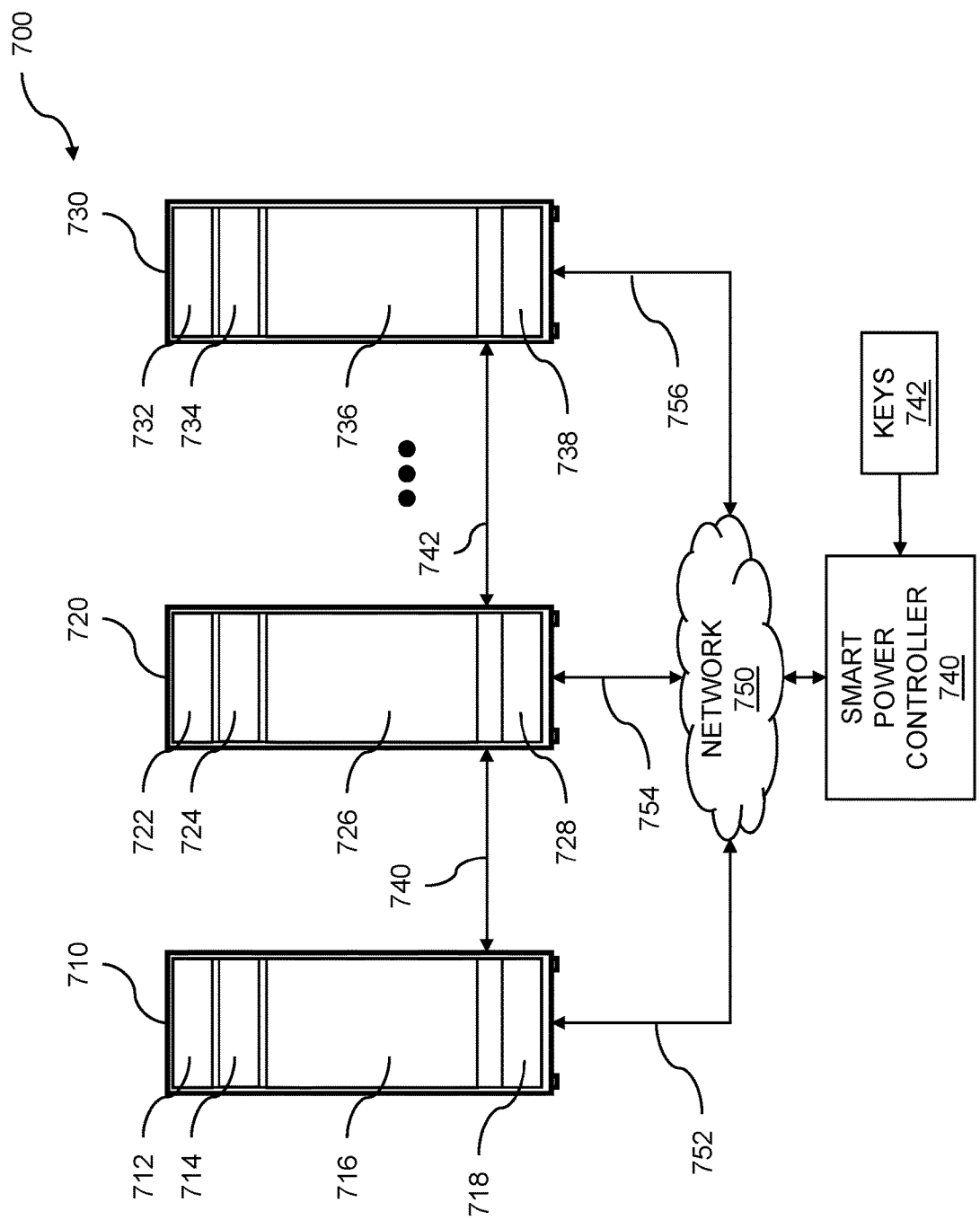
FIG. 7 shows for a datacenter representation with smart power control.

FIG. 7 illustrates a datacenter representation with smart power control. Secure communication initiation and execution can be performed for datacenter power control. Information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The datacenter power infrastructure control is modified based on decryption of the first data payload by the second component within the datacenter.

A datacenter can include multiple data racks or information technology (IT) racks. Example 700 includes three data racks, indicated as a first rack 710, a second rack 720, and a third rack 730. While three data racks are shown in example 700, in practice, there can be more or fewer data racks. The first data rack 710 includes a power cache 712, a server 714, an additional server 716, and a power supply 718. The power supply 718 can be used for AC-DC conversion and/or filtering of power to be used by the servers 714 and 716, as well as replenishment of the power cache 712. In embodiments, the power cache 712 includes an array of rechargeable batteries. In embodiments, the batteries include, but are not limited to, lead-acid, nickel metal hydride (NiMH), lithium ion (Li-ion), nickel cadmium (NiCd), and/or lithium ion polymer (Li—Po) batteries. Similarly, the second data rack 720 includes a power cache 722, a server 724, an additional server 726, and a power supply 728. Furthermore, the third data rack 730 includes a power cache 732, a server 734, an additional server 736, and a power supply 738. The data racks are interconnected by communication links 740 and 742. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 700, a power cache can be included in each of the multiple data racks within the datacenter. In embodiments, the power cache includes multiple batteries spread across the multiple data racks.

The power racks, rack 710, rack 720, and rack 730 are in communication with the network 750 using communication links 752, 754, and 756. The communication links can include a local area network (LAN) within a datacenter, a wide area network (WAN) for communications among multiple datacenters, and so on. The communication links 752, 754, and 756 can be wired links, wireless links, hybrid links, etc. A smart power controller 740 is in communication with the network 750. Communication between the network and the smart power control can include wired, wireless, and hybrid techniques. The smart power controller can obtain keys 742. The keys 742 can be uploaded by a user, downloaded from the Internet, and so on. The keys can be authenticated and can be exchanged using SNMP or other protocols between various components within the datacenter.

Figure 8:
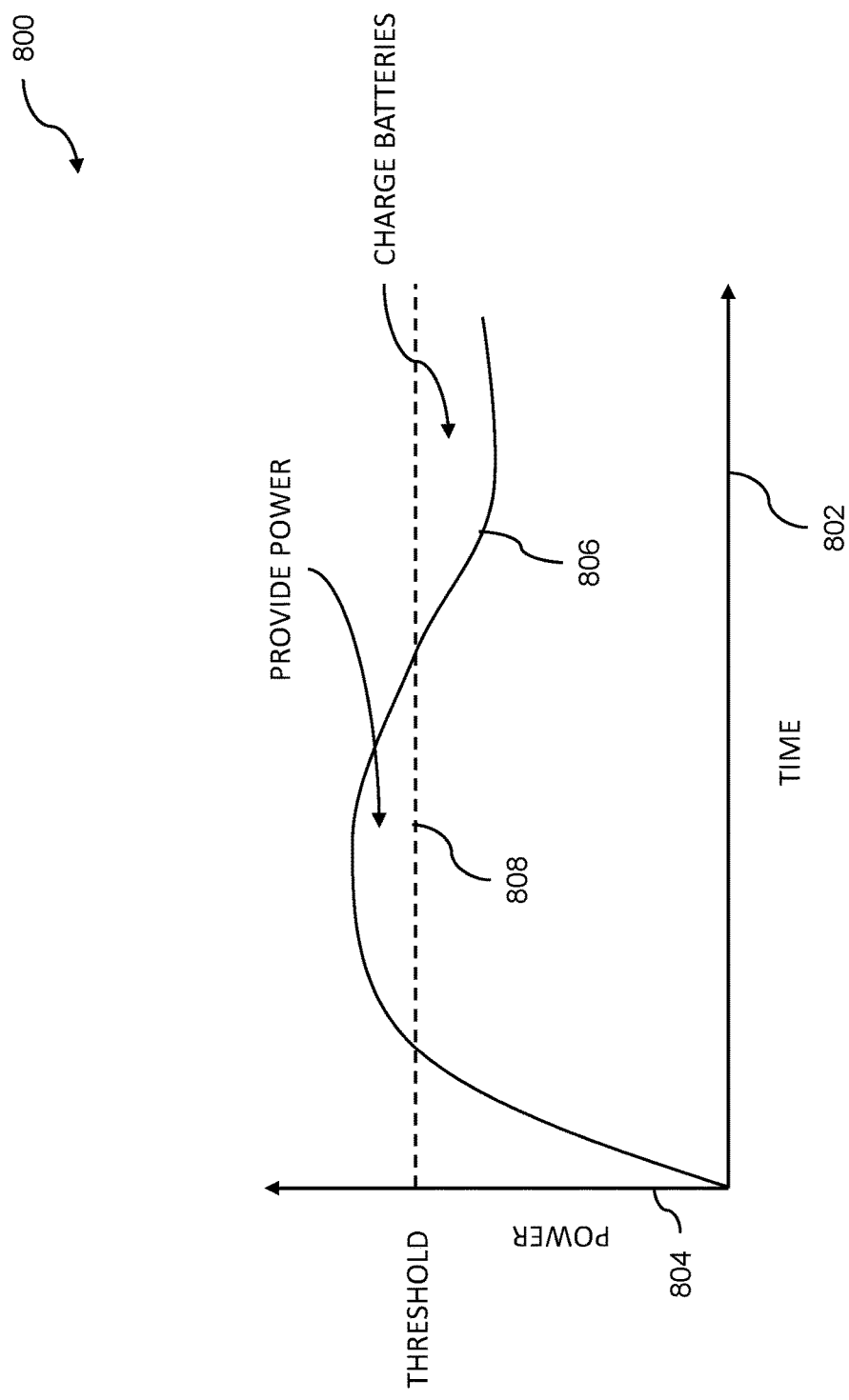
FIG. 8 illustrates a power consumption curve.

FIG. 8 illustrates a power consumption curve. A power consumption curve can be based on secure communication initiation and execution for datacenter power control. The secure communication enables modifying the datacenter power infrastructure control. A graph 800 includes a horizontal axis 802 representing time and a vertical axis 804 representing power consumption of a power load (such as a datacenter group, cluster, or data rack). A predetermined threshold 808 is established based on a power policy. The power policy can be defined by an administrator at the datacenter, a local power utility, or the like. The curve 806 represents the power consumption of a power load over time. During periods where the curve 806 is above the threshold 808, power is provided to the load by the power cache. During periods where the curve 806 is below the threshold 808, the power cache is replenished. In the case where the power cache comprises one or more batteries, the batteries are charged when the curve 806 is below the threshold 808. In embodiments, enabling the power cache comprises peak shaving.

Figure 9:
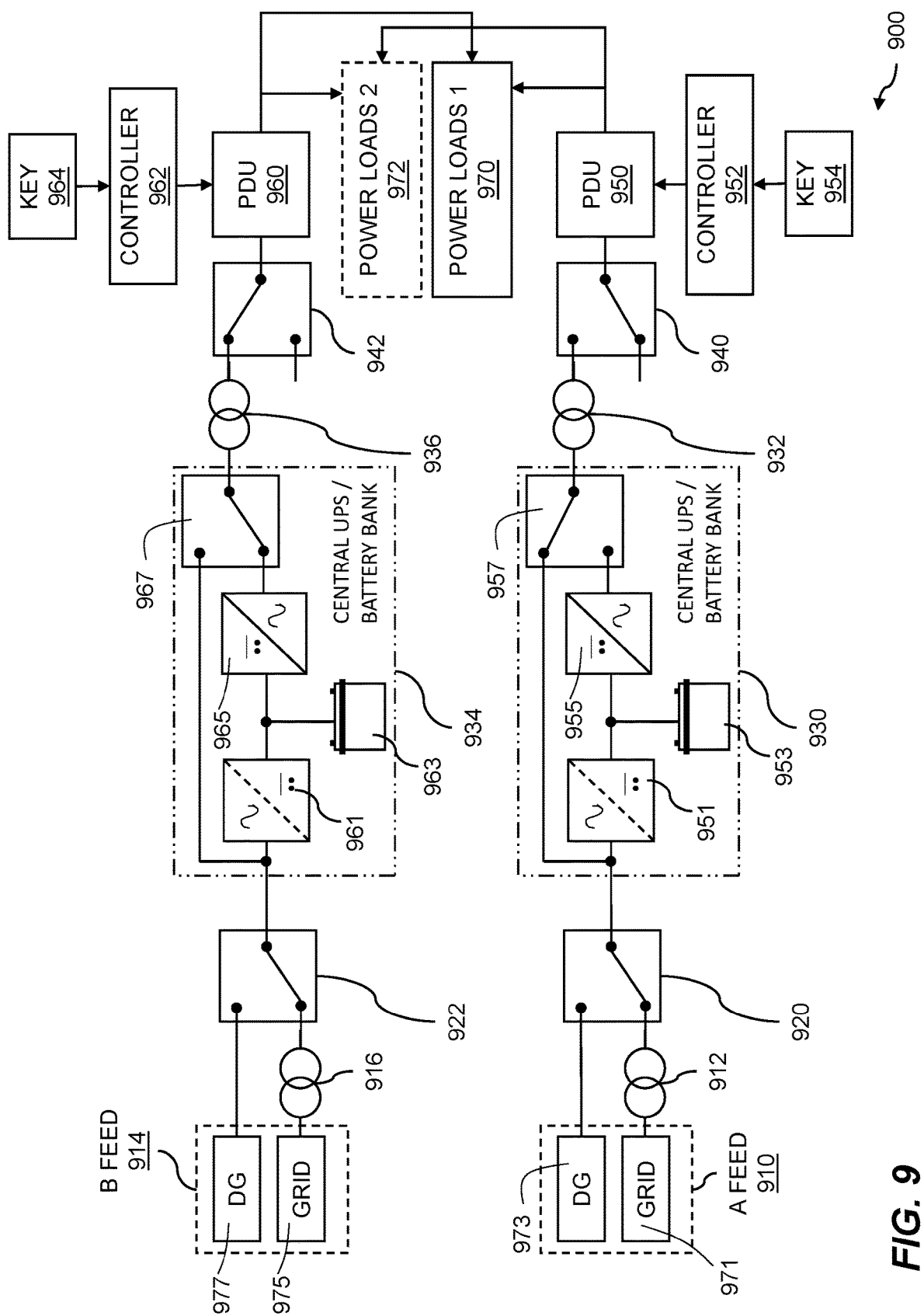
FIG. 9 shows a topology representation with multiple sets.

FIG. 9 shows a topology representation with multiple sets. Datacenter power control can be realized using secure communication initiation and execution. Information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The datacenter power infrastructure control is modified based on decryption of the first data payload by the second component within the datacenter.

The topology representation 900 includes a first main power source 910, referred to as the "A feed." The topology representation 900 further includes a second main power source 914, referred to as the "B feed." Each feed is capable of powering each device in the datacenter simultaneously. This configuration is referred to as 2N redundancy for power. The A feed 910 includes a grid source 971, and a secondary, local source of a diesel generator (DG) 973. The grid source 971 is input to a power regulator 912 and then into one input of a switch block 920. The diesel generator 973 is connected to a second input of the switch block 920. The switch block 920 can be configured, by arrangement of a power policy, to select the diesel generator source or the grid source. The switch block 920 feeds into an uninterruptable power supply (UPS) 930. The UPS 930 includes an AC-DC converter 951 configured to charge a power cache 953. In embodiments, the power cache 953 is a battery. The UPS 930 further includes a DC-AC converter 955 that feeds into an input of a switch block 957. The output of the switch block 920 feeds into a second input of the switch block 957. The output of the UPS 930 is input to a power regulator 932, and then to an input of a switch block 940. The switch block 957 can be configured, based on a power policy, to provide power from the power cache, or bypass the power cache and provide power directly from the local or grid power source. The second input of the switch block 940 is not connected, such that if the second input is selected, the A feed 910 is disconnected from the PDU 950. The PDU (Power Distribution Unit) distributes power within a datacenter and feeds the power loads 970 within the datacenter. In embodiments, a second set of power loads 972 may be added as part of a simulation of a dynamic power scenario. A controller 952 controls the PDU 950. The controller can be an intelligent power controller. The controller 952 can receive a power policy for use in the datacenter. The controller 952 uses a key 954. The key can be used to support secure communications to and from the controller 952. The key 952 can be uploaded by a user, downloaded from the internet, embedded in the controller, and so on.

Similarly, the B feed 914 includes a grid source 975, and a secondary, local source of a diesel generator (DG) 977. The grid source 975 is input to a power regulator 916 and then into one input of a switch block 922. The diesel generator 977 is input to a second input of the switch block 922. The switch block 922 can be configured, based on a power policy, to select the diesel generator source or the grid source. The switch block 922 feeds into a UPS 934. The UPS 934 includes an AC-DC converter 961 configured to a charge power cache 963. In embodiments, power cache 963 may be a battery. The UPS 934 further includes a DC-AC converter 965 that feeds into an input of a switch block 967. The output of the switch block 922 feeds into a second input of a switch block 967. The switch block 967 can be configured, based on a power policy, to provide power from the power cache, or to bypass the power cache and provide power directly from the local or grid power source. The output of the UPS 934 is input to a power regulator 936, and then to an input of a switch block 942. The second input of the switch block 942 is not connected, such that if the second input is selected, the B feed 914 is disconnected from the PDU 960, which in turn feeds the first set of power loads 970 and/or the second set of power loads 972 within the datacenter. A controller 962 controls the PDU 960. The controller 962 can receive a power policy for use in the datacenter. The controller 962 uses a key 964. The key can be used to support secure communications to and from the controller 962. The key 962 can be uploaded by a user, downloaded from the internet, embedded in the controller, and so on.

Thus, the A feed 910 and the B feed 914 comprise a first main power source and a second main power source. The power source and the second power source can provide 2N redundancy to the power load. Furthermore, in embodiments, the power source and a second power source share power to the multiple data racks, wherein the power is shared on a fractional basis. A variety of dynamic power scenarios can be simulated based on the topology shown in FIG. 9.

Figure 10:
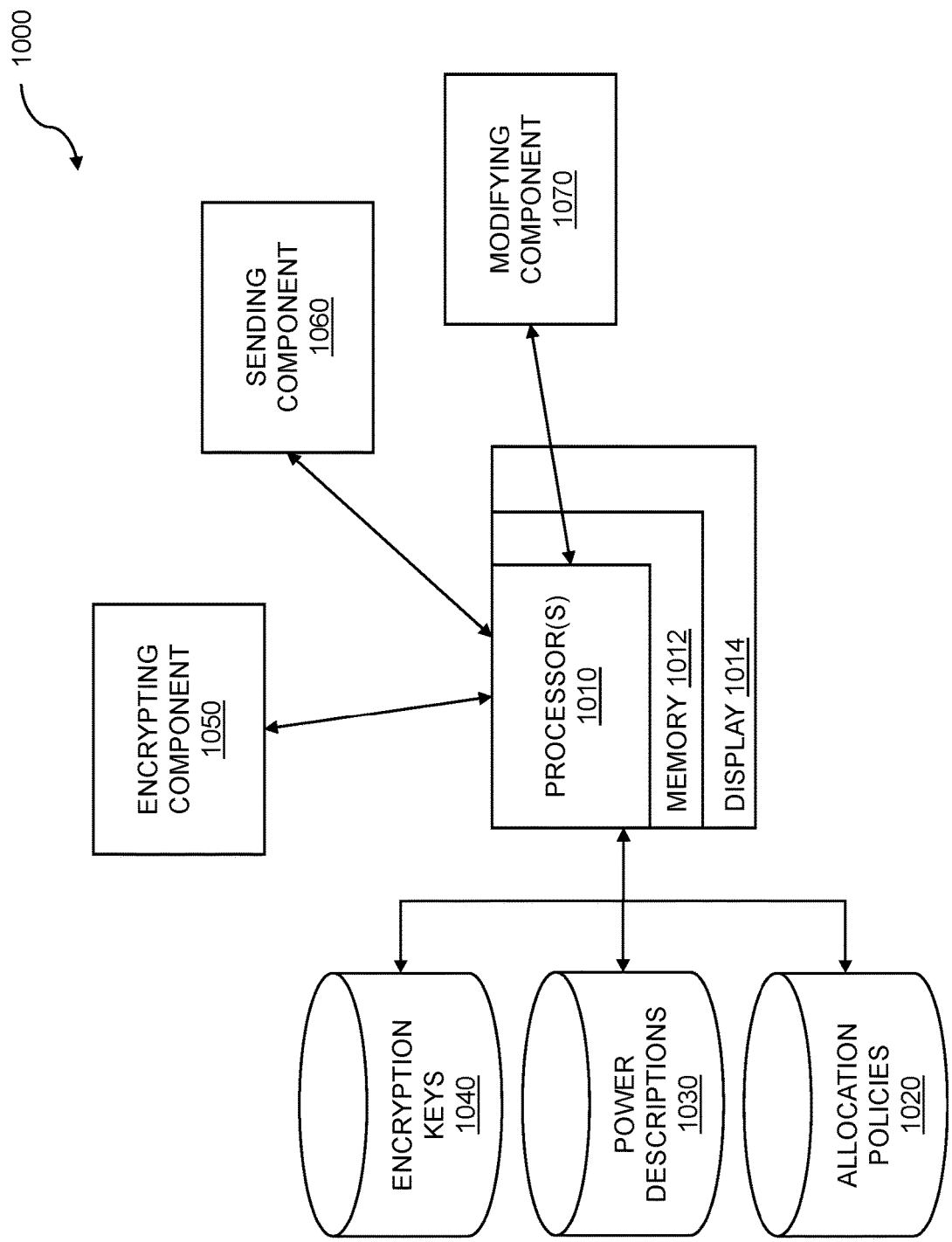
FIG. 10 shows a system diagram for secure communication for datacenter power control.

FIG. 10 shows a system diagram for secure communication for datacenter power control. Information relating to power control is encrypted for inclusion in a first data payload. The first data payload is used for datacenter power infrastructure control. The first data payload is sent from a first component within a datacenter to a second component within the datacenter. The first component and the second component enable power infrastructure power control of the datacenter. The datacenter power infrastructure control is modified based on decryption of the first data payload by the second component within the datacenter. The system 1000 can include one or more processors 1010 and a memory 1012 which stores instructions. The memory 1012 is coupled to the one or more processors 1010, wherein the one or more processors 1010 can execute instructions stored in the memory 1012. The memory 1012 can be used for storing instructions; for storing databases of power sources, power caches, and power loads; for storing information pertaining to load requirements or redundancy requirements; for storing power policies; for storing encryption keys; for system support; for user manuals; and the like. Information about secure communication initiation and execution for datacenter power control can be shown on a display 1014 connected to the one or more processors 1010. The display can comprise a television monitor, a projector, a computer monitor (including a laptop screen, a tablet screen, a netbook screen, and the like), a smartphone display, a mobile device, or another electronic display.

The system 1000 includes allocation policies 1020. In embodiments, the allocation policies 1020 are stored in a networked database, such as a structured query language (SQL) database. The allocation policies 1020 can include limits, such as power consumption limits, as well as switch configurations that can be used when certain conditions are met. For example, when conditions allow peak shaving to take place, and surplus power exists, the power policies can identify switches and their configurations to allow replenishing of the power caches. The system 1000 further includes a repository of power descriptions 1030. The power descriptions 1030 can include, but are not limited to, power descriptions of power loads, power caches, power supplies, rack power profiles, batteries, buses, circuit breakers, fuses, and the like. The system 1000 can include a repository of encryption keys 1040. The encryption keys can be used for initializing simple network management protocol (SNMP) communications using SNMP version 1 or version 2, and for communicating a first data payload with SNMP version 3. The encryption keys can be used to support encryption that can be accomplished by hashing.

The system 1000 includes an encrypting component 1050. The encrypting component 1050 is configured to encrypt information relating to power control for inclusion in a first data payload. The first data payload is used for datacenter power infrastructure control. The first data payload can include intelligent power control information, dynamic power change information and so on. The first data payload can include plain text with a timestamp, encrypted text with a timestamp, etc. The encrypting can include obscurity, where the obscurity can include misleading information, random information, and so on. The encrypted information can be based on hashing, where the hashing can be based on an encryption key 1040. The system 1000 includes a sending component 1060. The sending component 1060 can send the first data payload from a first component within a datacenter to a second component within the datacenter. The first component and the second component enable power infrastructure power control of the datacenter. The system 1000 includes a modifying component 1070. The modifying component 1070 can modify the datacenter power infrastructure control based on decryption of the first data payload by the second component within the datacenter. In embodiments, the modifying the datacenter power infrastructure control can dynamically change power control within the datacenter. The power policies can include power source assignment and usage, load balancing strategies, and so on.

The system 1000 includes a computer system for datacenter communication comprising: a memory which stores instructions; one or more processors attached to the memory wherein the one or more processors, when executing the instructions which are stored, are configured to: encrypt information relating to power control for inclusion in a first data payload, wherein the first data payload is used for datacenter power infrastructure control; send the first data payload from a first component within a datacenter to a second component within the datacenter, wherein the first component and the second component enable power infrastructure power control of the datacenter; and modify the datacenter power infrastructure control based on decryption of the first data payload by the second component within the datacenter.

Disclosed embodiments can include a computer program product embodied in a non-transitory computer readable medium for datacenter communication, the computer program product comprising code which causes one or more processors to perform operations of: encrypting information relating to power control for inclusion in a first data payload, wherein the first data payload is used for datacenter power infrastructure control; sending the first data payload from a first component within a datacenter to a second component within the datacenter, wherein the first component and the second component enable power infrastructure power control of the datacenter; and modifying the datacenter power infrastructure control based on decryption of the first data payload by the second component within the datacenter.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for datacenter communication comprising:
   encrypting information relating to power control for inclusion in a first data payload, wherein the first data payload is used for datacenter power infrastructure control;
   sending the first data payload from a first component within a datacenter to a second component within the datacenter, wherein the first component and the second component enable power infrastructure power control of the datacenter and wherein the second component provides an alert when the first data payload is suspect;
   enabling a datacenter lockdown policy based on the alert; and
   modifying the datacenter power infrastructure control based on decryption of the first data payload by the second component within the datacenter.

2. The method of claim 1 wherein the first data payload provides for intelligent power control within the datacenter.

3. The method of claim 1 wherein the modifying the datacenter power infrastructure control dynamically changes power control within the datacenter.

4. The method of claim 1 wherein the modifying the datacenter power infrastructure control changes power policies within the datacenter.

5. The method of claim 1 further comprising authenticating the first component using the first data payload.

6. The method of claim 5 further comprising communicating further data between the first component and the second component based on the authenticating.

7. The method of claim 1 wherein the first data payload includes a polling of the second component.

8. The method of claim 1 further comprising encrypting the first data payload using a first key.

9. The method of claim 8 wherein the first key is communicated outside of the power infrastructure power control of the datacenter.

10. The method of claim 9 wherein the first key is preloaded into the first component.

11. The method of claim 8 wherein the first key implicitly identifies the second component.

12. The method of claim 8 further comprising using the first key to decrypt the first data payload.

13. The method of claim 8 further comprising using a different key to decrypt the first data payload.

14. The method of claim 8 further comprising sending a second data payload from the second component to the first component.

15. The method of claim 14 further comprising encrypting the second data payload using a second key.

16. The method of claim 15 further comprising using the second key to decrypt the second data payload.

17. The method of claim 15 further comprising using a different key from the second key to decrypt the first data payload.

18. The method of claim 17 wherein the second key is preloaded into the first component.

19. The method of claim 8 wherein the first key includes dynamic key reset.

20. The method of claim 19 wherein the dynamic key reset includes use of a token.

21. The method of claim 1 further comprising authenticating a source of validation for the encrypting.

22. A computer program product embodied in a non-transitory computer readable medium for datacenter communication, the computer program product comprising code which causes one or more processors to perform operations of:
   encrypting information relating to power control for inclusion in a first data payload, wherein the first data payload is used for datacenter power infrastructure control;
   sending the first data payload from a first component within a datacenter to a second component within the datacenter, wherein the first component and the second component enable power infrastructure power control of the datacenter and wherein the second component provides an alert when the first data payload is suspect;
   enabling a datacenter lockdown policy based on the alert; and
   modifying the datacenter power infrastructure control based on decryption of the first data payload by the second component within the datacenter.

23. A computer system for datacenter communication comprising:
   a memory which stores instructions;
   one or more processors attached to the memory wherein the one or more processors, when executing the instructions which are stored, are configured to:
      encrypt information relating to power control for inclusion in a first data payload, wherein the first data payload is used for datacenter power infrastructure control;
      send the first data payload from a first component within a datacenter to a second component within the datacenter, wherein the first component and the second component enable power infrastructure power control of the datacenter and wherein the second component provides an alert when the first data payload is suspect;

enable a datacenter lockdown policy based on the alert; and modify the datacenter power infrastructure control based on decryption of the first data payload by the second component within the datacenter.

\* \* \* \* \*